(12) United States Patent
Caruel (10) Patent No.: US 12,123,354 B2
(45) Date of Patent: Oct. 22, 2024

(54) COOLING SYSTEM OF A COMPARTMENT OF PIECES OF EQUIPMENT IN A NACELLE OF AN AIRCRAFT PROPELLING ASSEMBLY

(71) Applicant: SAFRAN NACELLES, Gonfreville-l'Orcher (FR)

(72) Inventor: Pierre Charles Caruel, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/044,958

(22) PCT Filed: Oct. 1, 2021

(86) PCT No.: PCT/EP2021/077197
§ 371 (c)(1),
(2) Date: Mar. 10, 2023

(87) PCT Pub. No.: WO2022/073890
PCT Pub. Date: Apr. 14, 2022

(65) Prior Publication Data
US 2023/0373645 A1    Nov. 23, 2023

(30) Foreign Application Priority Data
Oct. 6, 2020  (FR) ...................................... 2010187

(51) Int. Cl.
*F02C 7/25*    (2006.01)
*F02C 7/18*    (2006.01)

(52) U.S. Cl.
CPC .................. *F02C 7/25* (2013.01); *F02C 7/18* (2013.01); *F05D 2260/608* (2013.01); *F05D 2300/50212* (2013.01)

(58) Field of Classification Search
CPC ..... F02C 7/25; F02C 7/18; F05D 2300/50212
See application file for complete search history.

(56) References Cited

U.S. PATENT DOCUMENTS 2,200,318 A * 5/1940 Yonkers .................... F01P 7/16
                                                        236/80 R
2,940,258 A * 6/1960 Lombard ................ F02C 7/047
                                                        62/505
(Continued)

FOREIGN PATENT DOCUMENTS

| EP | 2333288 A2 | 6/2011 |
| WO | 2004055338 A1 | 7/2004 |
| WO | 2018013347 A1 | 1/2018 |

OTHER PUBLICATIONS

Search Report from the French Intellectual Property Office on corresponding FR application (FR2010187) dated May 20, 2021.
(Continued)

*Primary Examiner* — Ted Kim
(74) *Attorney, Agent, or Firm* — Alumen IP Law PC (57) ABSTRACT

A system for cooling a compartment for equipment in a nacelle having a member for drawing a cooling flow and a device for admitting the cooling flow into the compartment, having: a regulating member movably mounted with the ability to move in a first direction of movement limiting the admission when the internal pressure of the compartment is below the external pressure, and in a second direction of movement increasing the admission when the internal pressure is above the external pressure; a return member configured to keep the regulating member in a neutral open position and to damp the movement of the regulating member during modifications in the ratio of the pressures; a pressing member activated by a heat-sensitive element and configured to move the regulating number into a closed position so as to isolate the compartment in the event of fire.

13 Claims, 9 Drawing Sheets

(56) References Cited

U.S. PATENT DOCUMENTS

| | | | |
|---|---|---|---|
| 3,001,745 A * | 9/1961 | Saunders | B64D 13/00 236/80 R |
| 4,301,833 A | 11/1981 | Donald, III | |
| 10,590,799 B2 | 3/2020 | Zebian et al. | |

OTHER PUBLICATIONS

International Search Report and Written Opinion on corresponding PCT application (PCT/EP2021/077197) from International Searching Authority (EPO) dated Dec. 7, 2021.

* cited by examiner

Prior Art

COOLING SYSTEM OF A COMPARTMENT OF PIECES OF EQUIPMENT IN A NACELLE OF AN AIRCRAFT PROPELLING ASSEMBLY

TECHNICAL FIELD

The present invention relates to the field of nacelles of aircraft propelling assemblies and is more particularly directed towards a cooling system of a compartment of pieces of equipment.

Figure 1:
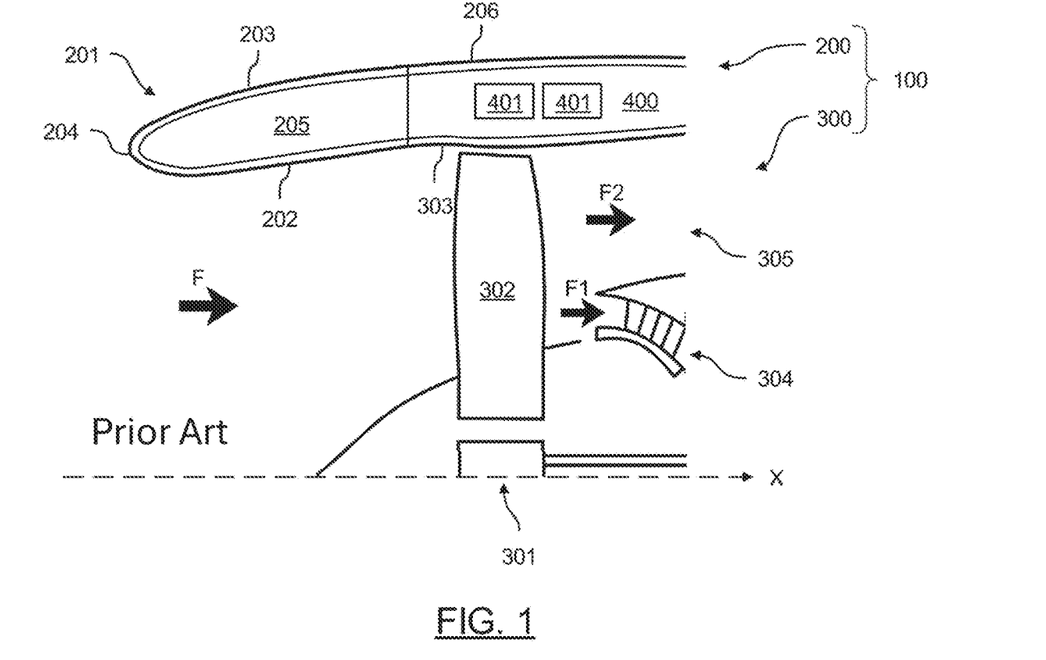
FIG. 1 is a schematic representation in a truncated longitudinal half cross-section view of an aircraft propelling assembly according to prior art.

In a known manner, with reference to FIG. 1, an aircraft propelling assembly 100 extending longitudinally along an axis X oriented from upstream to downstream and comprising an aircraft turbofan engine 300 and a nacelle 200 with longitudinal axis X is represented. The aircraft turbine engine 300 is configured to allow propulsion of the aircraft from the acceleration of an air stream F circulating from upstream to downstream into the turbine engine 300. The nacelle 200 extends externally about the aircraft turbine engine 300. Subsequently, the terms "upstream" and "downstream" are defined with respect to the orientation of the longitudinal axis X. The terms "inside" and "outside" are defined along the radial direction with respect to the longitudinal axis X.

As illustrated in [Fig. 1], the aircraft turbofan engine 300 upstream comprises a fan 301 comprising vanes 302 for accelerating the air flow F and a fan casing 303 extending externally facing the vanes 302 so as to guide the air flow F externally. The aircraft turbine engine 300 also comprises, downstream of the fan casing 303, a radially internal primary stream 304 and a radially external secondary stream 305, in which a first part and a second part of the air flow F respectively circulate, referred to as the primary air flow F1 and secondary air flow F2.

As illustrated in FIG. 1, the nacelle 200 externally delimits the secondary stream 305 upstream of the fan casing 303 and comprises an air inlet 201 at its upstream end. The air inlet 201 comprises an internal wall 202 for guiding the air flow F externally and an external wall 203, opposite to the internal wall 202, which are connected through an air inlet lip 204 in such a way as to form an annular cavity 205. The nacelle 200 also comprises a fan cover 206 as a downstream extension of the external wall 203, the fan casing 303 as a downstream extension of the internal wall 202 opposite to the fan cover 206.

Still with reference to FIG. 1, the fan cover 206 and the fan casing 303 together radially delimit a compartment 400 in which pieces of equipment 401 of the aircraft propelling assembly 100 are housed. Such pieces of equipment 401 designate by way of examples elements of the fuel circuit and the oil circuit (pump, filter, flowmeter, etc.), a device for opening a door thrust reversal system, a device for supplying hot air to the air inlet 201, etc.

In practice, it is necessary to cool the compartment 400 to prevent any overheating of the pieces of equipment 401. The compartment 400 should also be fluidly insulated from the turbine engine 300 so that in the event of a possible fire start in the compartment 400, it does not spread in the turbine engine 300, that is in the primary air flow F1 and in the secondary air flow F2.

It is known from patent application FR3081514A1 to circulate a cooling air flow in compartment 400 which is taken from the air flow F taken into the turbine engine 300. A valve is added at the intake of the cooling air flow, its closure being triggered when a fire starts, manually or automatically above a predetermined temperature threshold. In the closed position, the valve makes it possible to isolate the compartment from the primary air flow F1 and the secondary air flow F2, which avoids any fire spread. Such a system advantageously makes it possible to cool the compartment 400 effectively when the aircraft is in flight. When on the ground, the amount of cooling air is not sufficient, which shows drawbacks.

It is also known from patent application WO2004055338A1 to supply the compartment by means of an air flow duct comprising two flapper valves pivotably mounted between an open position and a closed position. A spring holds the flapper valves in the open position. When the pressure difference between inside and outside of the compartment exceeds a threshold, the air flow moves the flapper valves to the closed position by overcoming the return force of the spring. Such a duct does not allow effective cooling for any operating conditions of the aircraft.

The invention thus is directed to a system for cooling a compartment 400 which is effective both when the aircraft is in flight and on the ground and which, in the event of a fire in the compartment 400, makes it possible to avoid fire spread in the turbine engine 300.

SUMMARY

The invention relates to a cooling system of a compartment of pieces of equipment in a nacelle of an aircraft propelling assembly, said cooling system comprising at least one member for collecting a cooling air flow from an air flow external to the nacelle and at least one intake device for taking one cooling air flow into the compartment, said intake device comprising:

at least one wall delimiting the compartment inlet and comprising at least one port for fluidly communicating the collecting member and compartment, at least one member for regulating the cooling air flow taken into the compartment, movably mounted at the port:
  in a first direction of movement limiting cross-sectional area of the port when the internal pressure of the compartment is less than the external pressure, in order to limit the cooling air flow taken in, and
  in a second direction of movement increasing cross-sectional area of the port when the internal pressure is greater than the external pressure, in order to increase the cooling air flow taken in, at least one return member connecting the wall and the regulation member and configured:
  when the internal pressure is equal to the external pressure, to hold the regulation member in a neutral open position defining a predetermined cross-sectional area and
  during changes of the ratio between the internal pressure and external pressure, to dampen the movement of the regulation member in relation to the neutral open position, at least one safety device comprising at least one pressing member mounted in standby mode to the wall and configured to exert a pressing load onto the regulation member greater than a stress load on the return member, in order to move the regulation member into a closed position blocking the port, in order to fluidly isolate the compartment in the event of a fire, the safety device comprising at least one thermally sensitive element configured to activate the pressing member when the internal temperature of the compartment is greater than a predetermined temperature.

The cooling system of the invention advantageously makes it possible to cool a compartment of pieces of equipment of an aircraft propelling assembly, regardless of the flight conditions of the aircraft and especially on the ground, while forming a firewall in the event of a fire triggering in the compartment. Such a firewall especially makes it possible to prevent transport of the flame by convection from the compartment of pieces of equipment to the fan on the ground at low speed, in the event that the external pressure at the fan is less than the internal pressure in the compartment.

More precisely, the regulation member advantageously makes it possible to control the amount of cooling air flow taken into the compartment, by increasing the cross-sectional area of the port when the internal pressure in the compartment of pieces of equipment is greater than the external pressure of the cooling air flow collected, such as at ground and at low speed by way of examples, and by reducing the cross-sectional area of the port when the internal pressure is lower, such as under some high speed flight conditions. In other words, the cooling air flow taken in proportionally varies with the pressure difference between inside and outside the compartment of pieces of equipment. This is done by simply moving the regulation member under the effect of the load exerted by the cooling air flow, namely in a simple, immediate and passive way, that is without human intervention. The load exerted by the cooling air flow is advantageously opposed to that of the return member, which holds the regulation member open at a predetermined position at rest. It is set out that the term "damping" employed above means that the return member is configured to oppose the movement of the regulation member generated by the pressure difference between inside and outside of the compartment, so as to control movement of the regulation member.

In addition to its regulator function, the cooling system advantageously forms a firewall by simply closing the regulation member. Closing the regulation member is advantageously implemented by the pressing member activated by the thermal sensitive element, stated differently immediately and without human intervention, when the temperature of the compartment is abnormally high.

According to one aspect of the invention, the regulation member is rotatably mounted, so as to have a simple and economic structure.

According to one aspect of the invention, the regulation member is in the form of a butterfly valve mounted along an axis delimiting a holding portion, to which the return member is mounted, and a free portion. The cross-sectional area of the port is thus controlled by a single one-piece regulation member, with a simple and economic structure. The position of the butterfly valve results from the balance of the stress load exerted by the return member, the internal pressure of the compartment and the external pressure, which depends on the cooling air flow.

According to one aspect, the mounting axis of the regulation member is off-centered, the holding portion having a reduced length in relation to that of the free portion. In other words, the return member is mounted to a reduced holding portion of the regulation member, to reduce its overall size as well as the stress load it exerts, by limiting lever arm. The cooling air flow, on the other hand, mainly acts on the free portion.

According to one aspect of the invention, in the neutral open position, the free portion of the regulation member protrudes outwardly of the compartment. Such a configuration advantageously allows the cooling air flow to exert a load on the free portion which tends to reduce the cross-sectional area of the port when the external pressure is greater than the internal pressure.

Preferably, the regulation member in the neutral open position comprises an opening degree between 10 and 30°. Such an opening degree is optimal for low cooling flow.

According to one aspect of the invention, the return member and the pressing member are respectively configured to exert a stress load and a pressing load on opposite faces of the regulation member. The pressing member thus allows the regulation member to be closed without delay regardless of its position and the cooling air flow. Indeed, the pressing load exerted is greater than the sum of the stress load and the maximum load generated on the regulation member by the pressure difference between inside and outside the compartment of pieces of equipment. The pressing member thus allows simple and immediate securing of the compartment whenever necessary. Preferably, the pressing member is configured to come into contact with the inner face of the regulation member pointing to the compartment. Preferably, the return member is mounted to an outer face of the regulation member opposite to the inner face.

According to one aspect, the pressing member is in the form of a pressing spring. Preferably, the return member is in the form of a stress spring. Preferably, the pressing spring has a spring constant greater than a spring constant of the stress spring, preferably at least twice higher. Such a pressing spring allows the regulation member to be closed efficiently.

According to one aspect, the thermally sensitive element is mounted in such a way as to retain the stressed pressing member when the internal temperature of the compartment is lower than the predetermined temperature. Advantageously, the pressing spring thus stressed allows an immediate pressing load to be applied when released.

Preferably, the thermally sensitive element is mounted to the inner face of the wall so as to be in contact with the internal temperature of the compartment. Preferably, the thermally sensitive element is interposed between the wall and the pressing member in order to hold the pressing member stressed.

According to one aspect, the thermally sensitive element comprises a material configured to melt when the internal temperature of the compartment is higher than the predetermined temperature, allowing simple and fast, non-reversible activation of the pressing member. Preferably, the thermally sensitive element comprises an aluminum alloy.

According to another aspect, the thermally sensitive element comprises at least two materials configured to expand differently when the internal temperature of the compartment is higher than the predetermined temperature, allowing simple, fast and reversible activation of the pressing member. Preferably, the thermally sensitive element comprises only two materials configured to expand differently when the internal temperature of the compartment is higher than the predetermined temperature, being preferably in the form of two distinct leaves connecting the pressing member and the wall differently.

Preferably, the predetermined temperature is between 200° C. and 600° C., preferably between 350° C. and 450° C., higher than the temperature normally noticed in the compartment, which allows a fire to be detected as quickly as possible and avoids its spread outside the compartment, particularly in the turbine engine of the aircraft.

According to one preferred aspect of the invention, the pressing member comprises a first support end attached to the wall and a free end configured to come into contact with the regulation member. Preferably, the pressing member is in the form of a pressing spring, preferably a simple and economical spring leaf. Preferably, the pressing member comprises a second support end mounted to the thermally sensitive element. Preferably, the support ends of the spring leaf are bent to increase its elasticity.

Preferably, the return member is in the form of a simple and economical spring leaf. Preferably, the spring leaf comprises two support ends mounted to the wall and to the regulation member, preferably bent to increase elasticity of the return member.

According to one preferred aspect, the wall forms a stop for the regulation member in the closed position. Preferably, the pressing member is configured to retain the regulation member against the wall in the closed position. The closed position thus isolates the compartment tightly and securely.

According to one preferred aspect, the intake device of the cooling system comprises a plurality of stress springs, so as to apply a plurality of stress loads distributed over the regulation member rather than a single high stress load at one point, and to ensure operation in the event of failure of one of the springs.

Preferably, the intake device of the cooling system comprises the same number of pressing members and stress springs, preferably mounted opposite relative to the wall. This improves closing of the regulation member in the event of a fire and ensures operation in the event of one of the springs failing. Preferably, the safety device comprises the same number of thermally sensitive elements and pressing members connected two by two.

The invention also relates to a nacelle of an aircraft propelling assembly comprising a turbine engine extending longitudinally along an axis oriented from upstream to downstream and configured to allow propulsion of the aircraft from acceleration of an air flow circulating from upstream to downstream in the turbine engine, said nacelle extending externally around the turbine engine along the longitudinal axis, externally delimiting the compartment and comprising a cooling system as previously described.

Preferably, the nacelle has an air inlet upstream comprising an internal wall for guiding the air flow and an external wall, opposite to the internal wall, which are connected by an air inlet lip, and the collecting member of the cooling system opens into the internal wall of the air inlet so as to collect the air flow. The resulting cooling air flow thus taken in at the air intake is advantageously fresh and allows efficient cooling. In addition, at low aircraft speeds, the internal pressure is lower than the ambient pressure, thereby ensuring minimum suction flow rate of the cooling air flow.

Preferably, the collecting member is in the form of a duct extending into the annular cavity of the air inlet for guiding the cooling air flow to the port in a simple and convenient way.

Preferably, the cooling system comprises a single hole extending over a section of the circumference of the nacelle, allowing sufficient cooling on its own.

The invention also relates to the assembly of a cooling system as previously described and of a compartment of pieces of equipment of an aircraft propelling assembly, with the wall of the intake device delimiting the inlet of the compartment.

The invention also relates to the assembly of a nacelle as described previously and of a compartment of pieces of equipment, the nacelle externally delimiting the compartment, the wall of the intake device delimiting upstream of the compartment.

The invention also relates to an aircraft propelling assembly comprising a turbine engine and the assembly of a nacelle and a compartment of pieces of equipment as previously described, the turbine engine extending longitudinally in an axis oriented from upstream to downstream and configured to allow propulsion of the aircraft from the acceleration of an air flow circulating from upstream to downstream in the turbine engine, said nacelle extending externally around the turbine engine along the longitudinal direction.

Preferably, the turbine engine comprising a fan comprising vanes and a fan casing mounted facing it, the nacelle comprising a fan cover extending as a downstream extension of the external wall of the air inlet, the fan casing extending as a downstream extension of the internal wall opposite to the fan cover, the fan cover and the fan casing together radially delimit the compartment.

The invention also relates to a method for operating a cooling system of a compartment of pieces of equipment in a nacelle of an aircraft propelling assembly as previously described, the operating method comprising:
  a step of regulating the cooling air flow taken into the compartment by moving the regulation member as a function of the ratio between the external pressure and the internal pressure of the compartment, so as to modify the cross-sectional area of the port,
  when the internal temperature in the compartment exceeds a predetermined temperature, a step of securing the compartment by moving the regulation member into a closed position blocking the port, so as to fluidly isolate the compartment in the event of a fire.

The entire operating method is advantageously implemented automatically, without human intervention, as a function of the external pressure, the internal pressure of the compartment and its internal temperature. The regulation step thus makes it possible to adapt the cross-sectional area of the port at each modification of the ratio between internal pressure and external pressure immediately. The securing step is in turn configured to be implemented only once, immediately and non-reversibly.

BRIEF DESCRIPTION OF THE DRAWINGS

The invention will be better understood upon reading the following description, given as an example, and by referring to the following figures, given as non-limiting examples, in which identical references are given to similar objects.

The FIG. 5B and

FIG. 7A and

It should be noted that the figures set out the invention in detail in order to implement the invention, said figures can of course be used to better define the invention if necessary.

DETAILED DESCRIPTION

Figure 2:
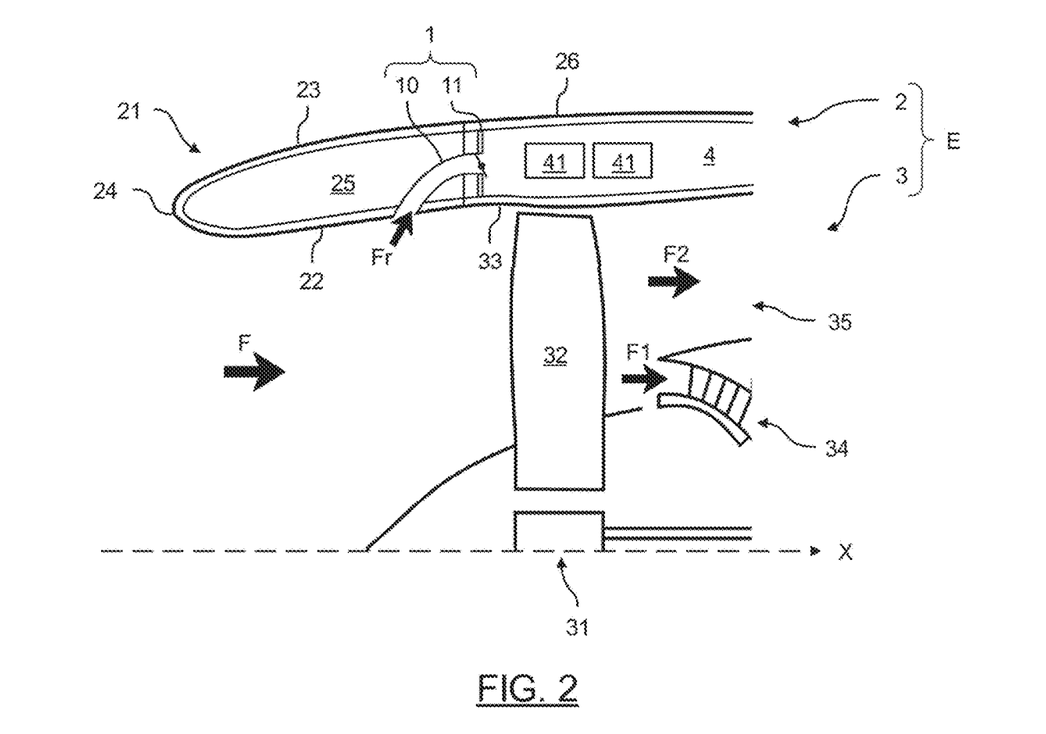
FIG. 2 is a schematic representation in a truncated longitudinal half cross-section view of an aircraft propelling assembly with a cooling system of a compartment of pieces of equipment in the nacelle according to one embodiment of the invention.

With reference to FIG. 2 and as described in the preamble, an aircraft propelling assembly E extending longitudinally along an axis X oriented from upstream to downstream and comprising an aircraft turbojet engine 3 and a nacelle 2 with a longitudinal axis X. The aircraft turbine engine 3 is configured to allow propulsion of the aircraft from the acceleration of an air flow F circulating from upstream to downstream into the turbine engine 3. The nacelle 2 extends externally around the aircraft turbine engine 3. Subsequently, the terms "upstream" and "downstream" are defined with respect to the orientation of the longitudinal axis X. The terms "inside" and "outside" are defined along the radial direction with respect to the longitudinal axis X.

As illustrated in FIG. 2 and described in the preamble, the aircraft turbojet engine 3 upstream comprises a fan 31 comprising vanes 32 for accelerating the air flow F and a fan casing 33 extending externally facing the vanes 32 so as to guide the air flow F externally. The aircraft turbine engine 3 also comprises, downstream of the fan 33, a radially internal primary stream 34 and a radially external secondary stream 35, in which a first part and a second part of the air flow F, referred to as the primary air flow F1 and secondary air flow F2 respectively circulate.

As illustrated in FIG. 2 and described in the preamble, the nacelle 2 externally delimits the secondary stream 35 upstream of the fan casing 33 and comprises an air inlet 21 at its upstream end. The air inlet 21 comprises an internal wall 22 for guiding the air flow F externally and an external wall 23, opposite to the internal wall 22, which are connected by an air inlet lip 24 in such a way as to form an annular cavity 25. The nacelle 2 also comprises a fan cover 26 extending as a downstream extension of the external wall 23, the fan casing 33 extending as a downstream extension of the internal wall 22 opposite to the fan cover 26.

Still with reference to FIG. 2 and as described in the preamble, the fan cover 26 and the fan casing 33 together radially delimit a compartment 4 in which pieces of equipment 41 of the aircraft propelling assembly E are housed. Such pieces of equipment 41 designate by way of examples elements of the fuel circuit and the oil circuit (pump, filter, flowmeter, etc.), a device for opening a door thrust reversal system, a device for supplying hot air to the air inlet 21, etc.

According to the invention and as illustrated in FIG. 2, the nacelle 2 further comprises a cooling system 1 for cooling the compartment 4 which comprises a collecting member 10 for collecting a cooling air flow Fr in the external air flow F as well as an intake device 11 for taking the cooling air flow Fr into the compartment 4. Such a cooling system 1 is configured:

on the one hand, to ensure cooling of the pieces of equipment 41 for all flight conditions of the aircraft and especially when the aircraft is on the ground and on the other hand, to form a firewall in the event of triggering a fire in compartment 4, in order to avoid any spread of fire outside compartment 4 and especially in the turbine engine 3.

In the example in FIG. 2, the collecting member 10 is in the form of a duct extending into the annular cavity 25 of the air inlet 21 and opening, on the one hand, into the internal wall 22 of the air inlet 21 and, on the other hand, into the intake device 11 of the cooling system 1. Such a collecting member 10 is thus configured to collect the external air flow F upstream of the fan 31, unlike a conventional cooling system which collects the cooling air flow Fr at the fan casing 33, downstream of the fan 31, as close as possible to the compartment 4 to be cooled. Collecting at the air inlet 21, upstream of the fan 31 rather than downstream, advantageously enables more efficient cooling because the cooling air flow Fr is fresher. It goes without saying that the collecting member 10 could be in another form and that the cooling system 1 could comprise more than one collecting member 10.

It is set out that the pressure of the cooling air flow Fr collected directly depends on the external air flow F, in turn depending on the speed of the aircraft and the engine speed. In practice, the pressure of the air flow F is greater when the aircraft is flying at high speed than when it is on the ground or at low speed. The same applies to the cooling air flow Fr.

Such variations in the pressure of the cooling air flow Fr result in variations in the ratio between the internal pressure of the compartment 4 and the external pressure, which are utilized by the intake device 11, as described below. The external pressure is especially higher than the internal pressure when the cooling air flow Fr is large, namely in high-speed flight. The external pressure is inversely lower than the internal pressure when the cooling air flow Fr is low, namely on the ground.

Figure 3:
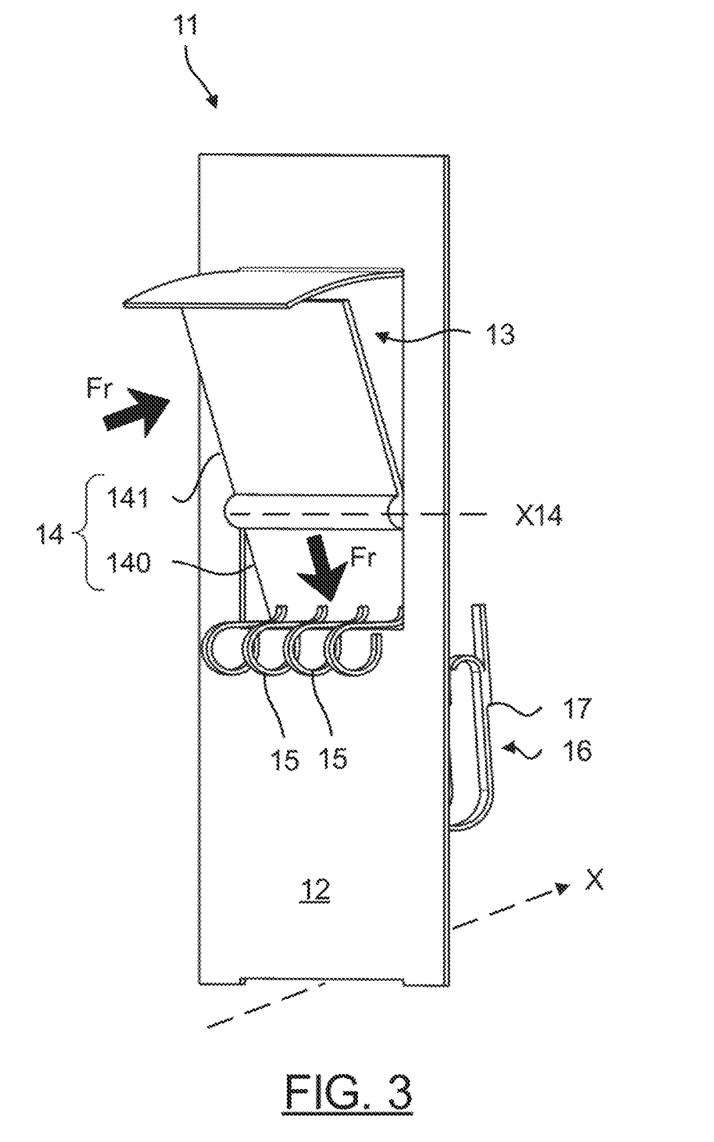
FIG. 3 is a schematic perspective representation from outside of the compartment of the cooling system of FIG. 2.
Figure 4:
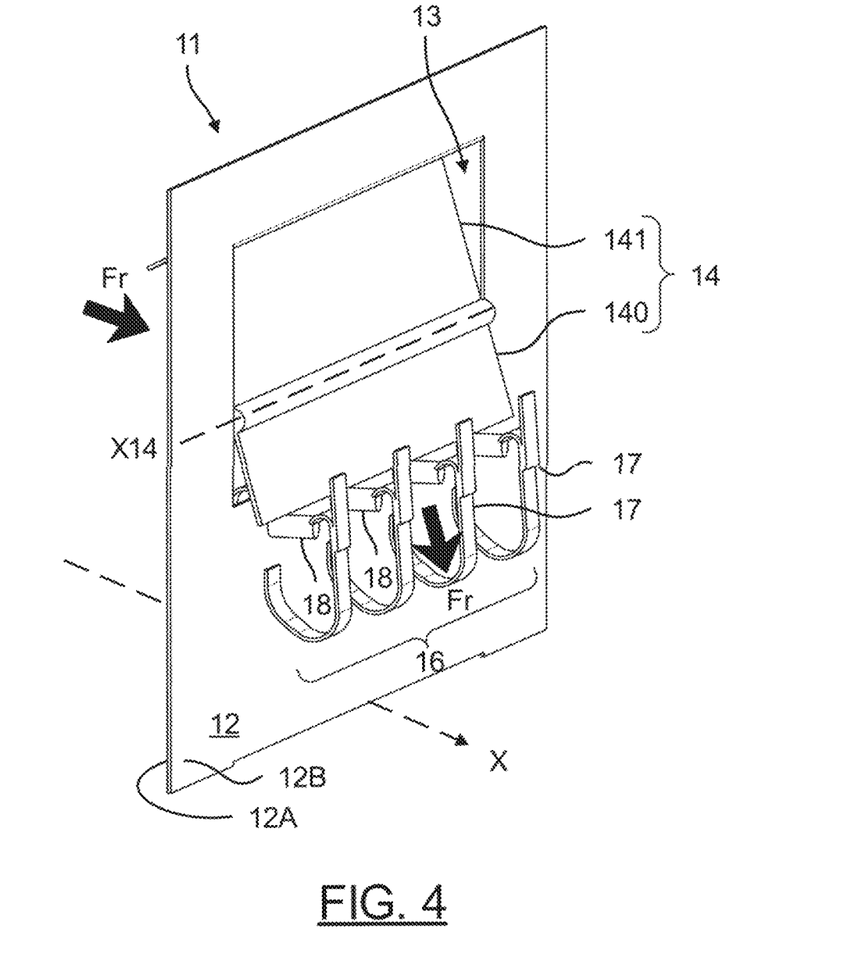
FIG. 4 is a schematic perspective representation from inside the compartment of the cooling system of FIG. 2.

According to the invention and with reference to FIGS. 3 and 4, the intake device 11 of the cooling system 1 comprises a wall 12 upstream delimiting the inlet of compartment 4 and comprising a port 13 for fluidly communicating the collecting member 10 and the compartment 4. The intake device 11 further comprises:

a regulation member 14 for the cooling air flow Fr taken into the compartment 4, which is movably mounted at the port 13 in order to limit the cross-sectional area of the port 13 when the external pressure is greater than the internal pressure, and to increase it otherwise, return devices 15 connecting the wall 12 and the regulation member 14 and configured to hold the regulation member 14 open in a predetermined position when the internal pressure is equal to the external pressure and, during variations in the cooling air flow Fr, to dampen movement of the regulation member 14, a safety device 16 comprising pressing members 17 mounted in standby mode to the wall 12 and thermally sensitive elements 18 configured to activate the pressing members 17 above a predetermined temperature in the compartment 4, the pressing members 17 then being configured to close the regulation member 14 by a pressing load greater than a stress load of the return members 15, in order to fluidly isolate the compartment 4 in the event of a fire.

Such an intake device 11 advantageously has a dual function, both for controlling cooling of the compartment 4 and isolating it in the event of a fire to avoid any spread, especially in the turbine engine 3. The intake device 11 moreover makes it possible to provide effective and adapted cooling for all aircraft operating conditions, in particular when the aircraft is on the ground and the cooling air flow Fr is low, by increasing the cross-sectional area of the port 13. The intake device 11 is passive and does not require any human intervention. Indeed, regulating cooling is cleverly implemented from the balance between external pressure and internal pressure of the compartment 4 and isolation of the compartment 4 from its internal temperature. In other words, the cooling air flow Fr taken in proportionally varies with the pressure difference between inside and outside of the compartment 4.

The structural and functional characteristics of the wall 12, the port 13, the return members 15 and the safety device 16 are more precisely described in the following.

As illustrated in FIGS. 2, 3 and 4, the wall 12 delimits the compartment 4 and extends downstream of the air inlet 21 of the nacelle 2, transversely to longitudinal axis X. In practice, the wall 12 forms a ring housed in the nacelle 2, delimited internally by the fan casing 33 and externally by the fan cover 26.

In the example of FIGS. 3 and 4, the port 13 is formed on a portion of the circumference of the wall 12. Such a port 13 advantageously allows sufficient supply of cooling air flow Fr into the compartment 4. In this example, the port 13 has a parallelepiped shape, but it could be different. It goes without saying that the wall 12 could have any number of ports 13 of any shape.

Still in the example of FIGS. 3 and 4, the regulation member 14 is rotatably mounted in a simple and convenient way. However, it goes without saying that the regulation member 14 could alternatively be moved differently, especially by translation longitudinal or transverse to the longitudinal axis X. In the example of FIGS. 3 and 4 described in the following, the regulation member 14 is in the form of a butterfly valve rotatably mounted about an axis X14. The mounting axis X14 extends transversely to the longitudinal axis X of the propelling assembly E so that the butterfly valve is configured to oscillate from upstream to downstream.

As illustrated in FIGS. 3 and 4, the regulation member 14 comprises a holding portion 140 and a free portion 141 extending on either side of the mounting axis X14, the return members 15 being mounted to the holding portion 140. In other words, the return members 15 are configured to exert a stress load on the regulation member 14 located on the holding portion 140 while the cooling air flow Fr is configured to exert a load mainly located on the free portion 141.

In the example of FIGS. 3 and 4, the mounting axis X14 of the regulation member 14 is off-centered so that the length of the holding portion 140 is reduced in relation to the length of the free portion 141. This creates a moment proportional to the pressure deviation about the mounting axis X14. In addition, in this example, the holding portion 140 and the free portion 141 extend radially inwardly and radially outwardly from the mounting axis X14, respectively.

As illustrated in FIG. 4, the regulation member 14 has a parallelepiped shape slightly larger than the port 13 so that it can block the port 13 bearing against the wall 12. This makes it possible to tightly isolate the compartment 4 in the event of a fire. More precisely, the holding portion 140 is configured to rest against the inner face of the wall 12 pointing to the compartment 4. In other words, the holding portion 140 extends downstream of the wall 12 on the side of the compartment 4 while the free portion 141 extends upstream of the wall 12 on the side of the collecting member 10, against the outer face of the wall 12. This results in reducing mobility of the regulation member 14. Indeed, the wall 12 forms an obstacle preventing the holding portion 140 from extending upstream of the wall 12 and as a result the free portion 141 from extending downstream of the wall 12. As a result, the cooling air flow Fr reaching the wall 12 is successively guided by the holding portion 140 and the free portion 141 from outside to inside in respect of the mounting axis X14 and is taken into compartment 4 pointing inwardly.

The mobility of the regulation member 14 is more precisely described in the following through the description of the return members 15 and the safety device 16.

In the example in FIG. 3, the intake device 11 comprises four return members 15 in the form of stress springs 15 mounted to the wall 12 equidistantly and aligned parallel to the mounting axis X14. This allows a stress load to be applied to the regulation member 14, and more precisely to the holding portion 140, which is distributed at several local points, for better control of the mobility of the regulation member 14 and to ensure their operation in the event of failure of one of them. However, it goes without saying that the intake device 11 could comprise any number of stress springs 15 depending on the size of the port 13, preferably at least two to distribute the stress load. It also goes without saying that the tension springs 15 could be mounted differently. A single stress spring 15 is described in the following, this description being valid for the other stress springs 15.

Figure 5A:
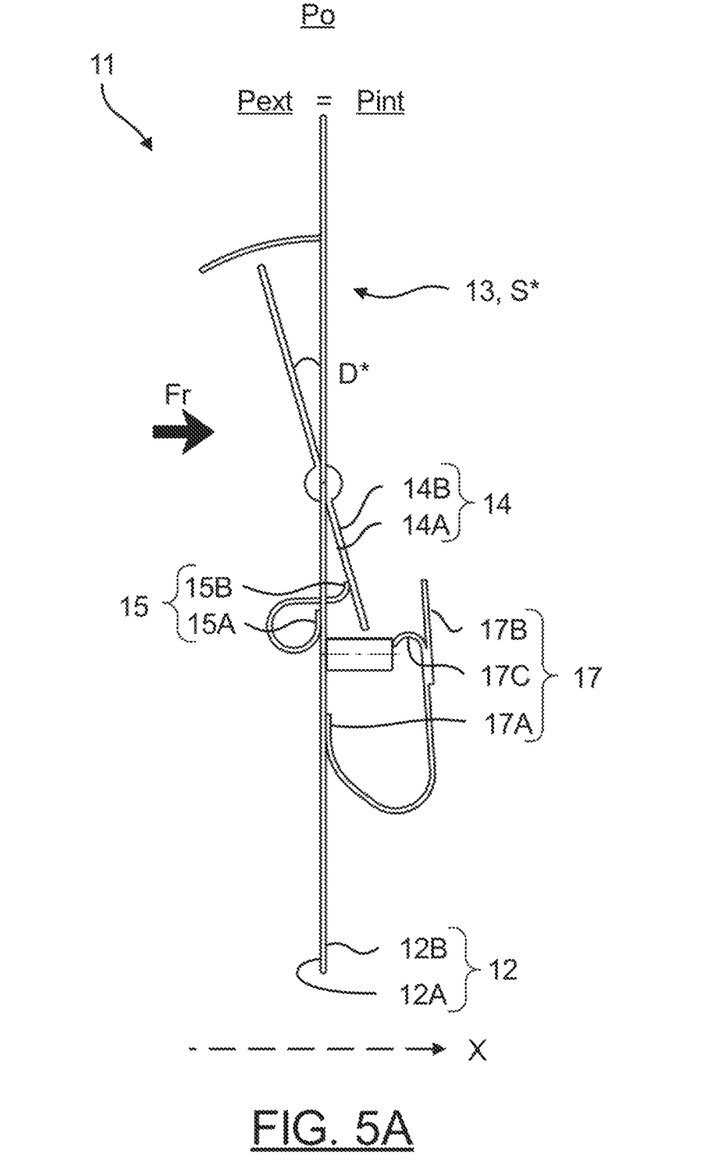
FIG. 5A is a schematic representation in a longitudinal cross-section view of the cooling system of FIG. 2 in the neutral open position.
Figure 5B:
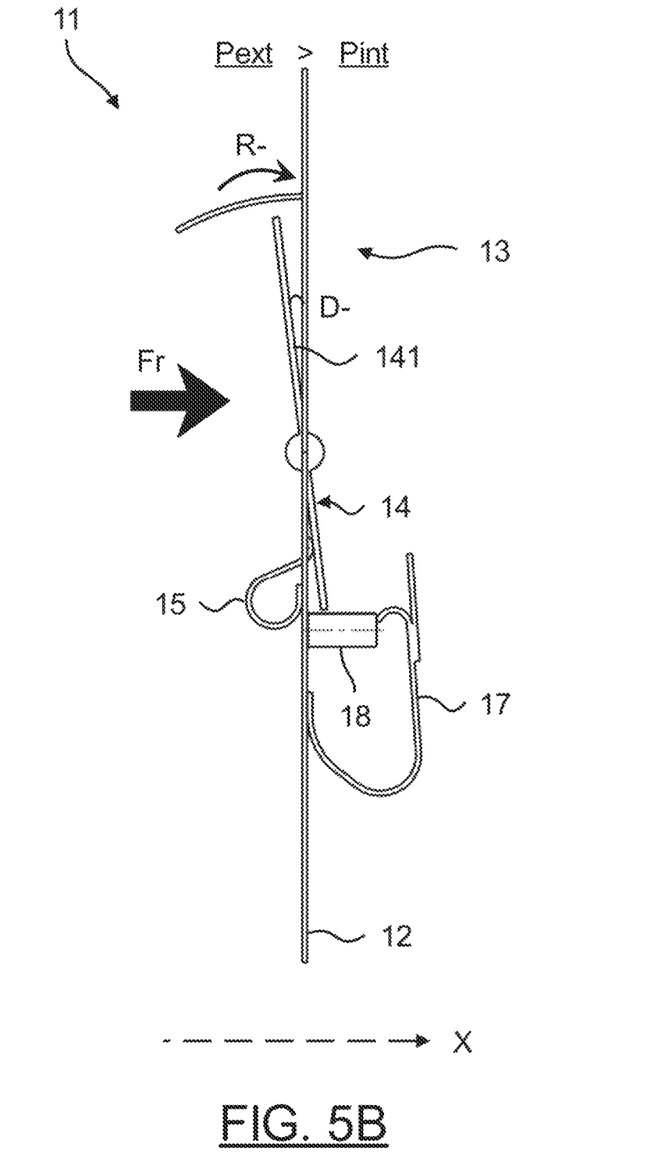
Figure 5C:
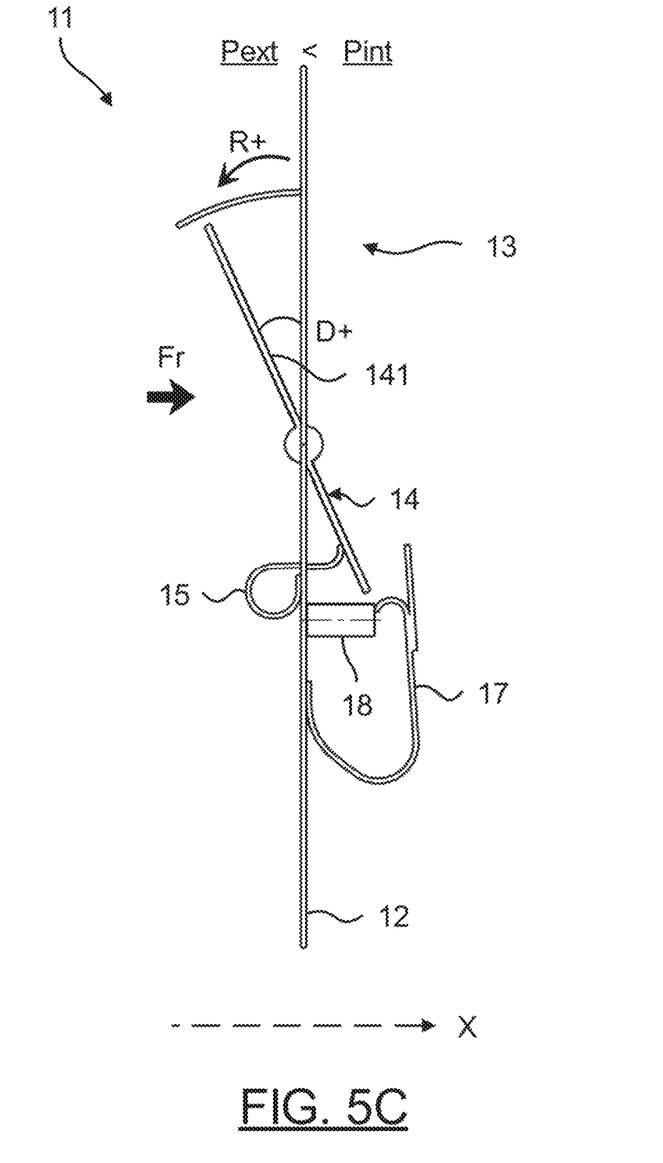
FIG. 5C are schematic representations in longitudinal cross-section view of the cooling system of FIG. 2 respectively upon increasing and decreasing the external pressure of the compartment.

With reference to FIGS. 5A to 5C, the stress spring 15 is in the form of a spring leaf comprising a first support end 15A secured to the wall 12 and a second support end 15B secured to the regulation member 14 at the holding portion 140. In this example, the support ends 14A, 15B are mounted to the outer face 12A, 14A of the wall 12 and of the regulation member 14 located upstream. Moreover, the support ends 14A, 14B are bent to increase elasticity of the stress spring 15.

As illustrated in FIG. 5A and described previously, the stress spring 15 is configured at rest, namely when the internal pressure Pint of the compartment 4 is equal to the external pressure Pext, to hold the regulation member 14 in a neutral open position Po. The regulation element 14 in the neutral open position Po preferably has an opening angle D* with respect to the wall 12 between 10 and 30°. In the neutral open position Po, the regulation member 14 defines a predetermined cross-sectional area S* adapted to allow sufficient cooling during pressure balance.

As illustrated in FIGS. 5B and 5C and described previously, the stress spring 15 is also configured, when modifying the ratio between the internal pressure Pint and the external pressure Pext, to dampen the rotation R−, R+ of the regulation member 14.

In the example in FIG. 5B illustrating an increase in the external pressure Pext relative to the internal pressure Pint, the cooling air flow Fr increases and exerts a greater load on the free portion 141 of the regulation member 14. Such a load tends to move the free portion 141 downstream in a first direction of rotation R− of the regulation member 14. This load also results in compressing the stress spring 15, which thereby exerts a stress load limiting the rotation R− of the regulation member 14 towards a new open balance position. In the new open position, the regulation member 14 thus has a reduced opening angle D− and defines a reduced cross-sectional area, so as to reduce the cooling air flow Fr taken into the compartment 4.

Oppositely, in the example of FIG. 5C illustrating a decrease in the external pressure Pext relative to the internal pressure Pint, the cooling air flow Fr decreases and exerts less load on the free portion 141 of the regulation member 14. Such a load tends to move the free portion 141 upstream in a second direction of rotation R+ opposite to the first direction of rotation R−. This load also results in relaxing the stress spring 15, which thereby exerts a reverse stress load which limits the rotation R+ of the regulation member 14 towards a new open balance position. In the new open position, the regulation member 14 thus has an extended opening angle D+ and defines an extended cross-sectional area, so as to increase the cooling air flow Fr taken into the compartment 4.

To sum up, the stress spring 15 keeps the regulation member 14 at rest in a neutral open position Po and when it is compressed or relaxed following a modification in the cooling air flow Fr, the stress spring 15 exerts a stress load which dampens the rotation R−, R+ of the regulation member 14. Alternatively, the return member 15 could be in a form other than a stress spring 15, preferably a passive member not requiring any human intervention.

Figure 6:
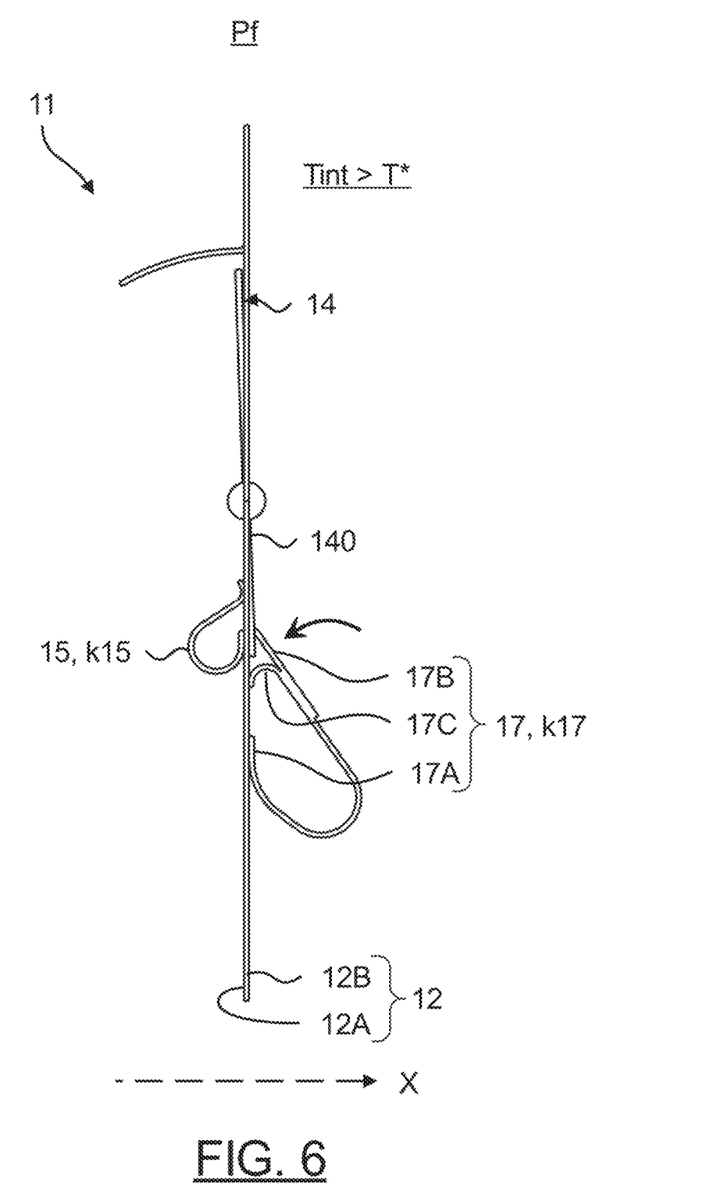
FIG. 6 is a schematic representation in a longitudinal cross-section view of the cooling system of FIG. 2 in the closed position.

In the example of FIGS. 4 and 6, the safety device 16 comprises four pressing members 17 mounted to the downstream inner face 12B of the wall 12, facing the stress springs 15 mounted to the upstream outer face 12A. Such a facing mounting advantageously makes it possible to oppose, in the event of a fire start, each pressing member 17 to a stress spring 15, so that the pressing load of a pressing member 17 opposes and exceeds the stress load of the stress spring 15 facing it. In this example, the safety device 16 further comprises four thermally sensitive elements 18 each configured to activate a pressing member 17. It goes without saying that the safety device 16 may comprise any number of pressing members 17 and thermally sensitive elements 18, positioned in any way. A single pressing member 17 and a single thermally sensitive element 18 are described in the following, this description being valid for the other ones.

As illustrated in FIG. 4, the thermally sensitive element 18 is then mounted to the wall 12, at the downstream inner face 12B, so as to be in contact with the internal temperature Tint of the compartment 4. As illustrated in FIG. 6, the thermally sensitive element 18 is configured to melt when the internal temperature Tint of the compartment 4 is higher than a predetermined temperature T*, so as to activate the pressing member 17. In practice, the predetermined temperature T* is between 200° C. and 600° C., preferably between 350° C. and 450° C., namely representative of a fire start in the compartment 4. Preferably, the thermally sensitive element 18 comprises an aluminum alloy with a melting temperature corresponding to the predetermined temperature T*, such as an aluminum and copper alloy with a melting temperature substantially equal to 400° C. by way of example.

With reference to FIGS. 4 and 6, the pressing member 17 in turn is in the form of a pressing spring 17, and more precisely a spring leaf, mounted to the wall 12 and retained in standby mode by the thermally sensitive element 18. The pressing spring 17 is configured, once released by the thermally sensitive element 18, to exert a pressing load on the holding portion 140 of the regulation member 14, so as to press it against the wall 12, and thus move the regulation member 14 into a closed position Pf (FIG. 6) blocking the port 13. In practice, the pressing spring 17 comprises a spring constant k17 greater than that k15 of the stress spring 15, preferably at least twice as much, so as to move the regulation member 14 quickly and immediately, by exceeding the stress load exerted by the stress spring 15.

In the example of FIGS. 5A and 6, the pressing spring 17 comprises a first support end 17A secured to the wall 12, a second support end 17C mounted to the sensitive element thermally 18 in order to retain the pressing spring 17 in standby mode as well as a free end 17B configured to exert the pressing load on the holding portion 140 of the regulation member 14. In this example, the support ends 17A, 17C of the pressing spring 17 are bent to increase its elasticity. The free end 17B in turn extends protruding downstream of the holding portion 140 of the regulation member 14 so as to be able to move it upstream against the wall 12. With reference to FIG. 5A, the pressing spring 17 is prestressed and has an energy reserve to close the regulation member 14 as will be set forth in the following.

Figure 7A:
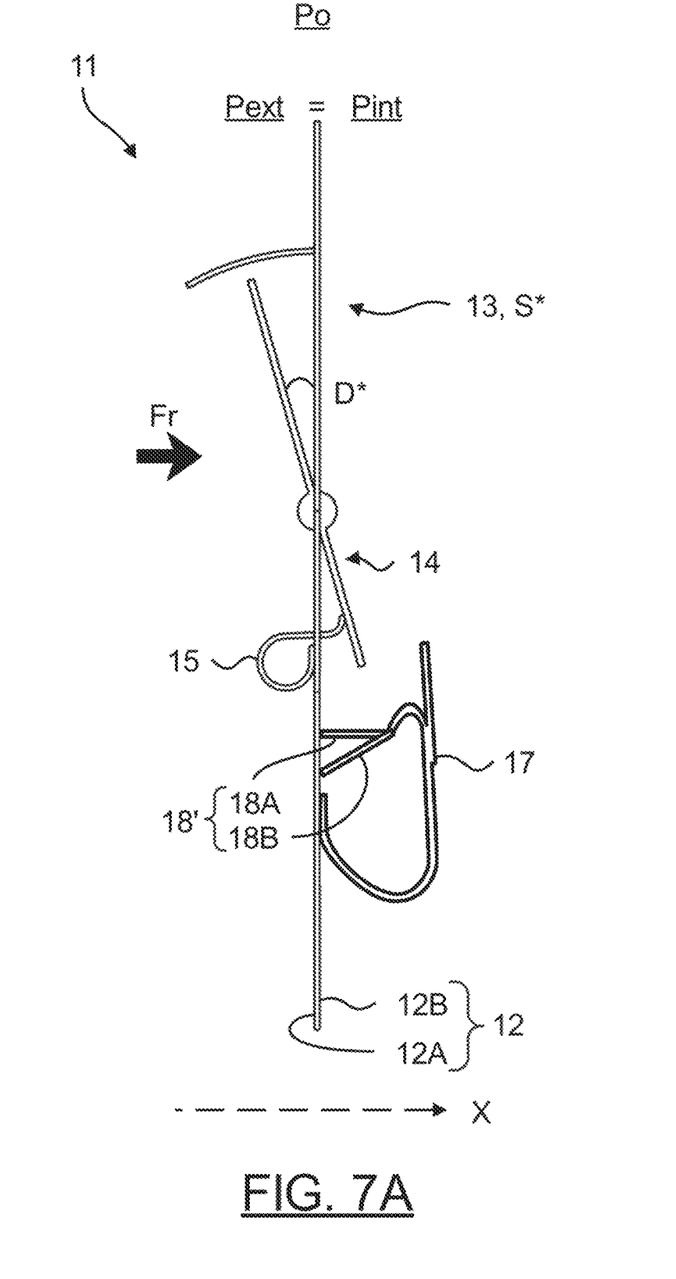
Figures 7B, 8:
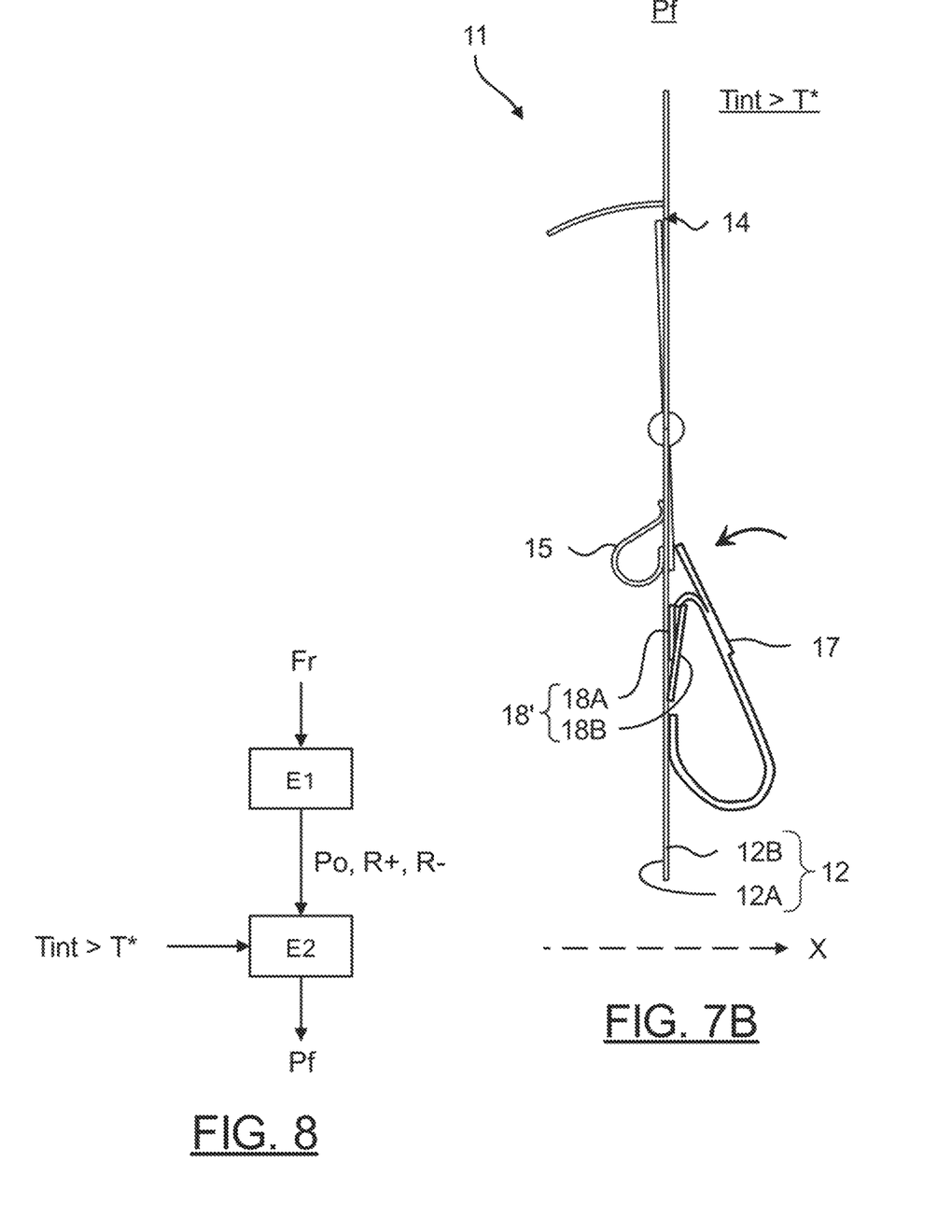
FIG. 7B are schematic representations in longitudinal cross-section view of the cooling system according to an alternative embodiment of the invention respectively in the neutral open position and in the closed position.
FIG. 8 is a schematic representation of the method of operating the cooling system of FIG. 2.

FIGS. 7A and 7B illustrate an alternative embodiment of the invention in which the thermally sensitive element 18' is in the form of two leaves 18A, 18B connecting the pressing member 17 to the wall 12 and comprising a material with a different thermal expansion coefficient. The leaves 18A, 18B are thus configured to expand differently when the internal temperature Tint of the compartment 4 is greater than the predetermined temperature T*, so as to move the pressing member 17 into the closed position Pf. In this example, the leaves 18A, 18B are both mounted to the second support end 17C (FIG. 6) of the pressing member 17, the first leaf 18A being mounted externally to the second leaf 18B to the wall 12. In addition, in this example, the second 18B leaf has a higher thermal expansion coefficient than the first leaf 18A. Thus, during a fire start, the second leaf 18B is configured to expand more than the first leaf 18A, which moves the pressing member 17 against the wall 12 in the closed position Pf. It goes without saying that the thermally sensitive element 18' could comprise more than two leaves 18A, 18B.

To sum up, the cooling system 1 of the invention comprises a collecting member 10 for collecting a cooling air flow Fr and an intake device 11 for taking the cooling air flow Fr into the compartment 4, comprising a regulation member 14 mounted in the port 13 of a wall 12. The regulation member 14 is configured, in cooperation with stress springs 15, to modify the cross-sectional area of the port 13 as a function of the pressure difference between inside and outside of compartment 4 and, in cooperation with a safety device 16, to block the port 13 when a fire starts in the compartment 4. The cooling system 1 of the invention advantageously makes it possible to cool the compartment 4 for all operating conditions of the aircraft, particularly on the ground in the presence of a low cooling air flow Fr by virtue of a larger cross-sectional area.

It is stated that, if the invention has been described in the case of an aircraft turbofan (dual flow) engine, it applies to any turbine engine, whether in particular a turbojet or a turboprop engine and whether it has a single flow or dual flow architecture.

With reference to FIG. 8, the invention also relates to a method for operating cooling system 1 comprising:
  a step E1 of regulating the cooling air flow Fr taken into the compartment 4 by moving the regulation member 14, in this example rotatably moving, as a function of the ratio between the external pressure Pext and the internal pressure Pint of the compartment 4, in order to modify the cross-sectional area of the port 13,
  and when the internal temperature Tint in the compartment 4 is greater than the predetermined temperature T*, a step of securing E2 the compartment 4 by moving the regulation member 14 into the closed position Pf, in order to fluidly isolate the compartment 4 in the event of a fire.

In practice, with reference to FIGS. 5B and 5C, the regulation step E1 is implemented by adapting the opening angle D−, D+ of the regulation member 14 according to the cooling air flow Fr. Thus, upon increasing the pressure of the cooling air flow Fr collected, for example during high speed flight of the aircraft, the latter exerts a greater load on the free portion 141 of the regulation member 14, which tends to reduce opening of the port 13 and thus to take less cooling air flow Fr into the compartment 4. Conversely, upon reducing the pressure of the cooling air flow Fr collected, for example when the aircraft is on the ground or at low speed, it exerts less load on the free portion 141 of the regulation member 14, which tends to increase opening of the port 13 and thus take more cooling air flow Fr into the compartment 4.

Such a regulation step E1 advantageously requires no human intervention and no active control and allows efficient cooling of the pieces of equipment 41 of the compartment 4 for all aircraft operating conditions.

The securing step E2 is in turn implemented by the pressing member 17 retained in standby mode by the sensitive element 18, namely immediately, automatically and irreversibly. As soon as the internal temperature Tint of the compartment 4 is greater than the predetermined temperature T*, the thermally sensitive element 18 melts, which releases the force of the pressing spring 17 which is pressed against the inner face 12B of the wall 12. In particular, the free end 17B exerts a pressing load on the holding portion 140 of the regulation member 14 which is greater than that of the stress spring 15 facing it. The second support end 17C abuts against the inner face 12B of the wall 12 to limit the load applied to the regulation member 14 in the closed position.

This allows compartment 4 to be fluidly isolated from the fire start in order to avoid any spread outside the compartment 4, especially in the turbine engine 3.

The invention claimed is:

1. A cooling system for a compartment of pieces of equipment in a nacelle of an aircraft propelling assembly, said cooling system comprising at least one collecting member for collecting a cooling air flow from an air flow external to the nacelle and at least one intake device for taking the cooling air flow into the compartment, said at least one intake device comprising:
   at least one wall configured to delimit an inlet of the compartment and comprising at least one port for fluidly communicating the at least one collecting member with the compartment;
   at least one regulation member for regulating the cooling air flow taken into the compartment, said at least one regulation member being movably mounted at the at least one port and being configured to move passively under a load exerted by the cooling air flow:
      in a first direction of movement limiting a cross-sectional flow area of the at least one port when an internal pressure in the compartment is less than an external pressure, in order to limit the cooling air flow taken in; and
      in a second direction of movement increasing the cross-sectional flow area of the at least one port when the internal pressure is greater than the external pressure, so as to increase the cooling air flow taken in;
   at least one return member connecting the at least one wall and the at least one regulation member and configured:
      when the internal pressure is equal to the external pressure, to hold the at least one regulation member in a neutral open position defining a predetermined cross-sectional flow area, and
      during changes in a ratio between the internal pressure and the external pressure, to dampen the travel of the at least one regulation member in relation to the neutral open position;
   at least one safety device comprising at least one pressing member mounted in a standby mode to the at least one wall and configured to exert a pressing load on the at least one regulation member greater than a stress load from the at least one return member, so as to move the at least one regulation member into a closed position blocking the at least one port, in order to fluidly isolate the compartment in the event of a fire, the at least one safety device comprising at least one thermally sensitive element configured to activate the at least one pressing member when an internal temperature of the compartment is greater than a predetermined temperature.

2. The cooling system according to claim 1, wherein the at least one regulation member is rotatably mounted.

3. The cooling system according to claim 1, wherein the at least one regulation member is a butterfly valve mounted along an axis delimiting a holding portion, to which the at least one return member is mounted, and a free portion.

4. The cooling system according to claim 3, wherein the axis for mounting the at least one regulation member is off-centered, the holding portion having a reduced length relative to the free portion.

5. The cooling system according to claim 3, wherein, in the neutral open position, the free portion of the at least one regulation member protrudes outwardly of the compartment.

6. The cooling system according to claim 1, wherein the at least one return member and the at least one pressing member are respectively configured to exert the stress load and a pressing load on opposite faces of the at least one regulation member.

7. The cooling system according to claim 1, wherein the at least one pressing member is a pressing spring.

8. The cooling system according to claim 7, wherein the at least one thermally sensitive element is mounted to retain the at least one pressing member stressed when the internal temperature of the compartment is less than the predetermined temperature.

9. The cooling system according to claim 1, wherein the at least one thermally sensitive element comprises a material configured to melt when the internal temperature of the compartment is greater than the predetermined temperature.

10. The cooling system according to claim 1, wherein the at least one thermally sensitive element comprises at least two materials configured to expand differently when the internal temperature of the compartment is greater than the predetermined temperature.

11. A nacelle of an aircraft propelling assembly comprising a turbine engine extending along a longitudinal axis oriented from upstream to downstream, and configured to allow propulsion of the aircraft from acceleration of an air flow circulating from upstream to downstream in the turbine engine, said nacelle extending around the turbine engine along the longitudinal axis, said nacelle externally delimiting the compartment and defining an air inlet at an upstream end, said air inlet comprising an internal wall for guiding the air flow and an external wall, opposite to the internal wall, which are connected through an air inlet lip, said nacelle comprising the cooling system according to claim 1, wherein the at least one collecting member opens into the internal wall of the air inlet so as to collect the air flow.

12. A method for operating a cooling system of a compartment of pieces of equipment in a nacelle of an aircraft propelling assembly according to claim 1, the operating method comprising:
- a step of regulating the cooling air flow taken into the compartment by passively moving the at least one regulation member under load exerted by the cooling air flow as a function of the ratio between the external pressure and the internal pressure of the compartment, in order to modify the cross-sectional flow area of the at least one port,
- when the internal temperature in the compartment is greater than a predetermined temperature, a step of securing the compartment by moving the at least one regulation member into a closed position blocking the at least one port, in order to fluidly isolate the compartment in the event of a fire.

13. A cooling system for a compartment in a nacelle of an aircraft, said cooling system comprising a collecting member for collecting a cooling air flow from an air flow external to the nacelle and an intake device for taking the cooling air flow into the compartment, said intake device comprising:
- a wall configured to delimit the inlet of the compartment, said wall comprising a port;
- a regulation member for regulating the cooling air flow taken into the compartment, said regulation member being passively movably mounted at the port, wherein movement of said regulation member is caused by the cooling air flow and has a first movement direction and a second movement direction:
  - wherein in the first movement direction, a cross-sectional flow area of the port is at a first size and an internal pressure in the compartment is less than an external pressure to limit the cooling air flow taken into the compartment; and
  - wherein in the second direction of movement, the cross-sectional flow area of the port is at a second size, which is larger than the first size, and the internal pressure is greater than the external pressure to increase the cooling air flow taken into the compartment;
- a return member connecting the wall and the regulation member and configured to hold the regulation member in a neutral open position to define a predetermined cross-sectional flow area when the internal pressure is equal to the external pressure and to dampen a travel of the regulation member in relation to a neutral open position during changes in a ratio between the internal pressure and the external pressure;
- a safety device comprising a pressing member mounted in a standby mode to the wall and configured to exert a pressing load on the regulation member greater than a stress load from the return member so as to move the regulation member into a closed position blocking the port to fluidly isolate the compartment in the event of a fire; and
- wherein the safety device comprising at least one thermally sensitive element configured to activate the pressing member when an internal temperature of the compartment is greater than a predetermined temperature.

* * * * *